Figure 1:
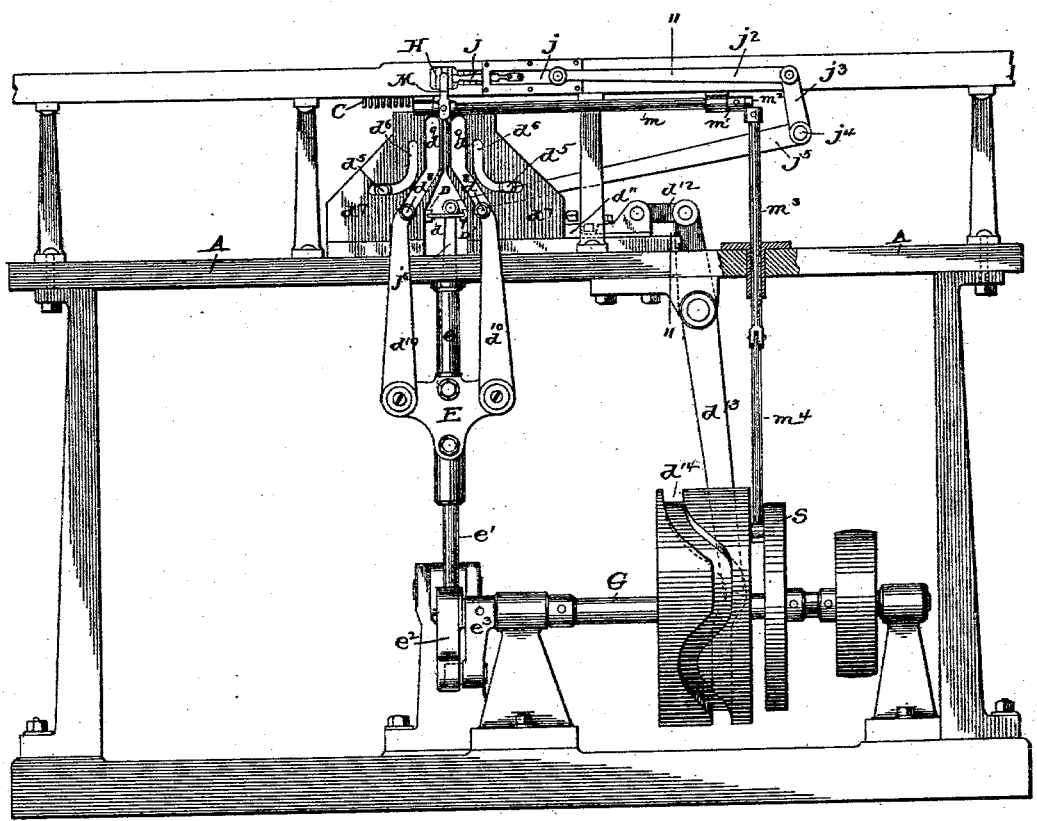

(No Model.) 7 Sheets—Sheet 1.

J. H. WHITE.
MACHINE FOR STICKING MATCH SPLINTS.

No. 473,372. Patented Apr. 19, 1892.

Witnesses:
W. W. Mortimer
H. R. Kennedy

Inventor:
J. H. White
By his Atty
Philip T. Dodge (No Model.)
J. H. WHITE.
MACHINE FOR STICKING MATCH SPLINTS.
No. 473,372.
Patented Apr. 19, 1892.
7 Sheets—Sheet 3.
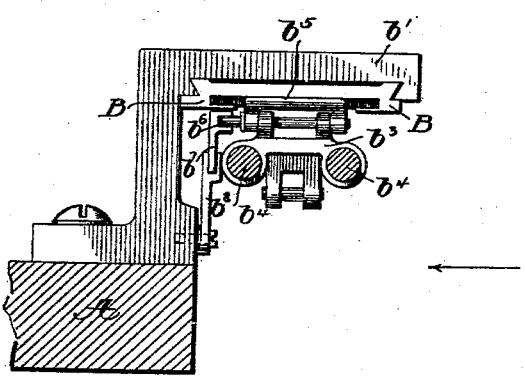
Fig. 4.
on line 4-4
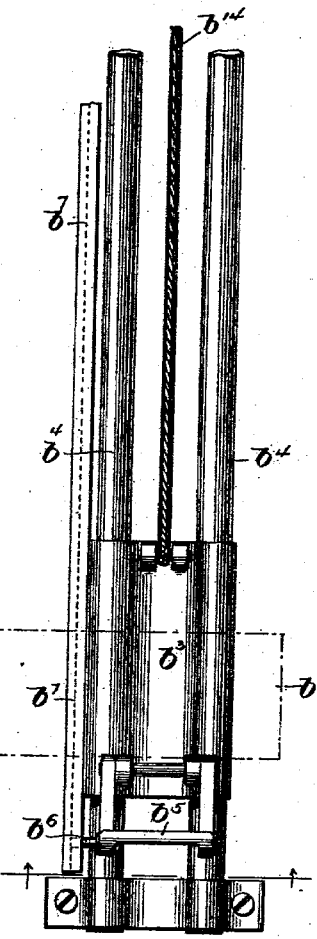
Fig. 5.
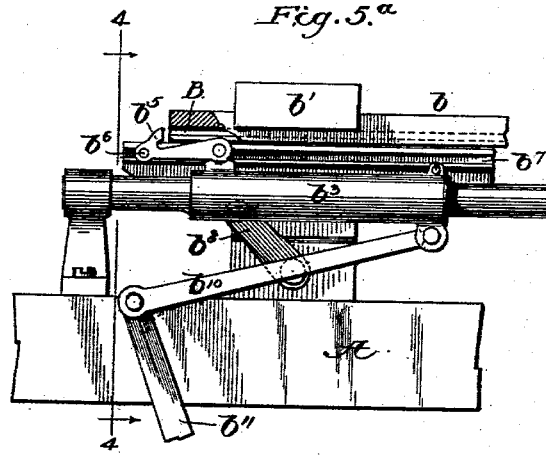
Fig. 5.ᵃ
Witnesses:
W. W. Mortimer.
W. R. Kennedy.
Inventor:
J. H. White
By his Atty
Philip T. Dodge (No Model.) 7 Sheets—Sheet 4.

J. H. WHITE.
MACHINE FOR STICKING MATCH SPLINTS.

No. 473,372. Patented Apr. 19, 1892.

on line 6-6 on line 6-6

Inventor:
J. H. White
By Phil. T. Dodge
Atty

Witnesses:
W. M. Mortimer
W. R. Kennedy (No Model.) 7 Sheets—Sheet 5.
J. H. WHITE.
MACHINE FOR STICKING MATCH SPLINTS.
No. 473,372. Patented Apr. 19, 1892.
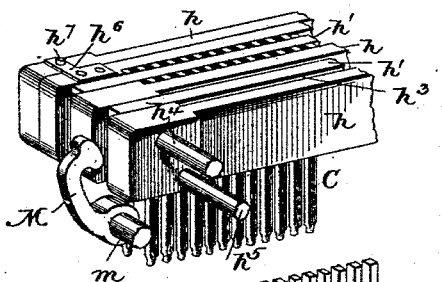
Fig. 8.
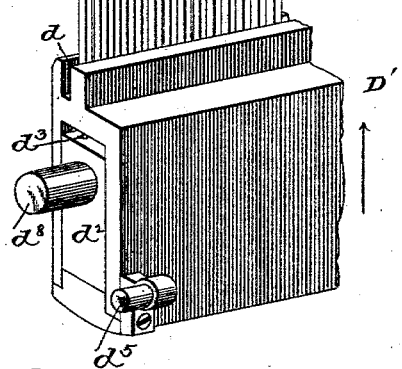
Fig. 9.
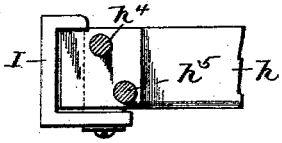
Fig. 10.
on line 10-10
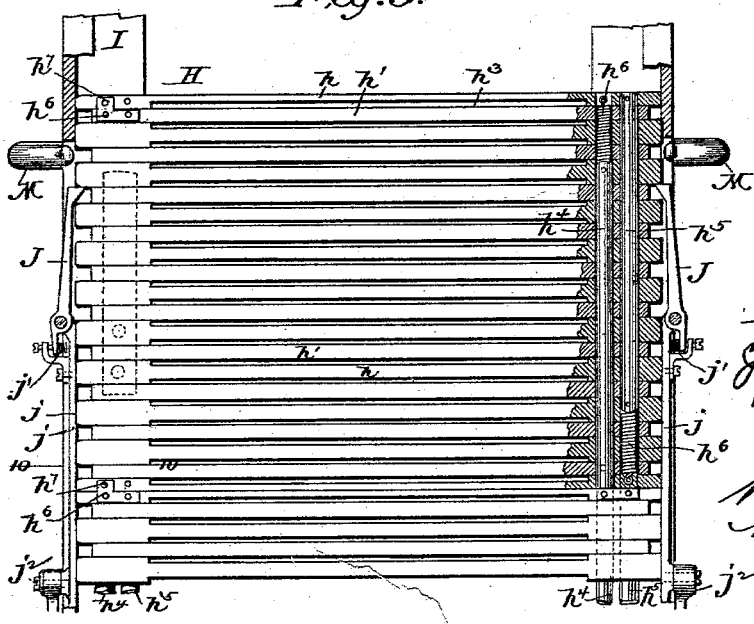
Inventor:
J. H. White
By his Atty
Phil T. Dodge
Witnesses:
M. R. Kennedy
M. M. Mortimer (No Model.) 7 Sheets—Sheet 7.
J. H. WHITE.
MACHINE FOR STICKING MATCH SPLINTS.
No. 473,372. Patented Apr. 19, 1892.
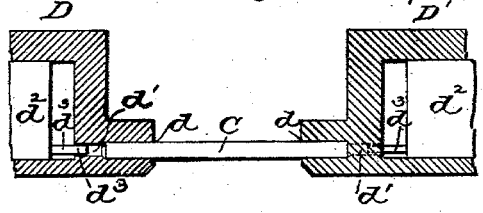
Fig. 12.
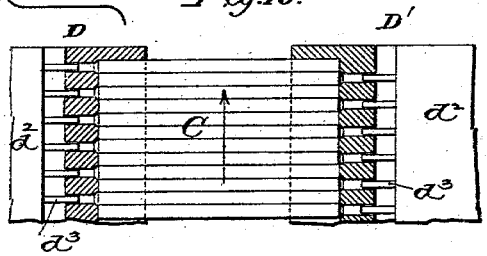
Fig. 13.
*Receiving Splints*
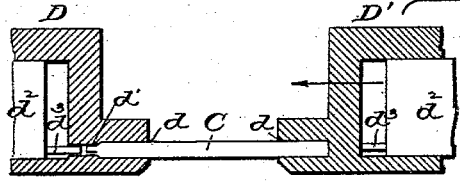
Fig. 14.
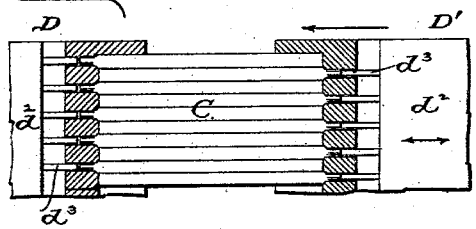
Fig. 15.
*Seating Splints in Carriers*
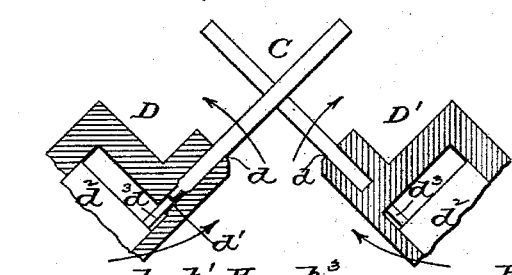
Fig. 16.
*Separating Splints*
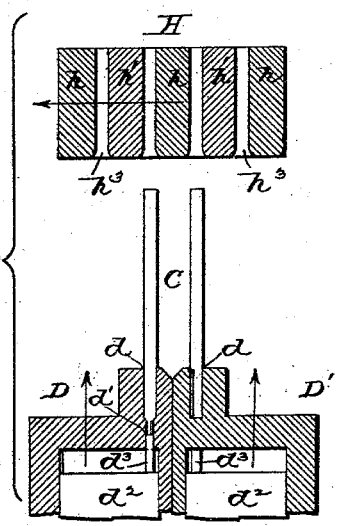
Fig. 17.
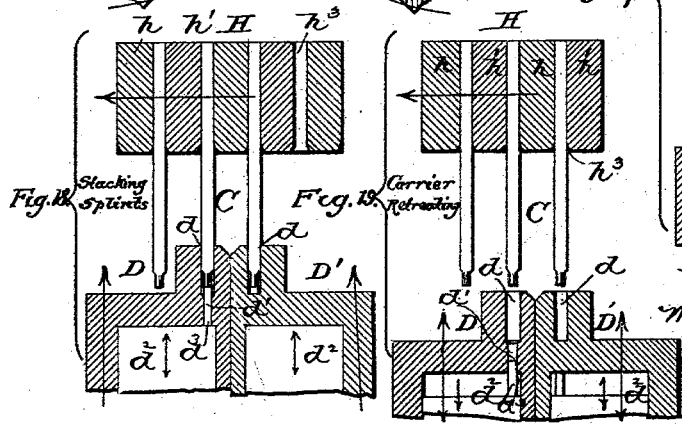
Fig. 18. *Stacking Splints*   Fig. 19. *Carrier Retracting*
Witnesses:   Inventor:
W. W. Mortimer   J. H. White
   By his Atty

UNITED STATES PATENT OFFICE.

JOHN H. WHITE, OF WASHINGTON, DISTRICT OF COLUMBIA.

MACHINE FOR STICKING MATCH-SPLINTS.

SPECIFICATION forming part of Letters Patent No. 473,372, dated April 19, 1892.

Application filed April 22, 1891. Serial No. 389,906. (No model.)

*To all whom it may concern:*

Be it known that I, JOHN H. WHITE, of Washington, in the District of Columbia, have invented certain Improvements in Machines for Sticking Match-Splints, of which the following is a specification.

In the manufacture of matches it is the custom to insert the splints temporarily into a slotted frame, a perforated plate, or equivalent device, whereby they are maintained in parallel positions, separated from each other while being dipped and dried.

It is the purpose of the present mechanism to receive the splints in close order from the cutting-machine or other source and insert them automatically and at the proper distances apart into the receiving frames or plates, or, in other words, to effect what is technically known as "sticking the splints."

The machine embraces as its more important features, grooved guides, whereby the splints introduced side by side in a close column or row are sustained at their opposite ends in two oppositely-arranged carriers to receive the opposite ends of the splints, provided with alternate openings, so that when the carriers are approximated the successive splints will be seated in the carriers alternately; and the invention consists in mechanism whereby the carriers are approximated to seat the splints therein and then separated and moved in a suitable direction to present the splints to the receiving frame or plate, in slatted receiving-frames of improved construction, in means for momentarily separating the slats to permit the safe and easy introduction of the splints between them, and in various other features, which will be hereinafter described in detail.

Figure 2:
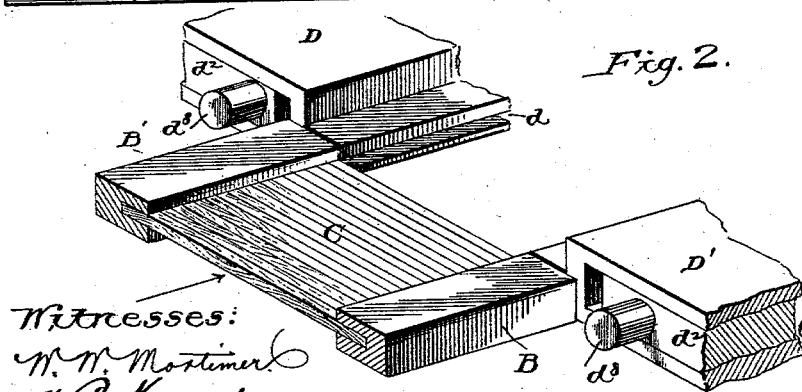
Figure 3:
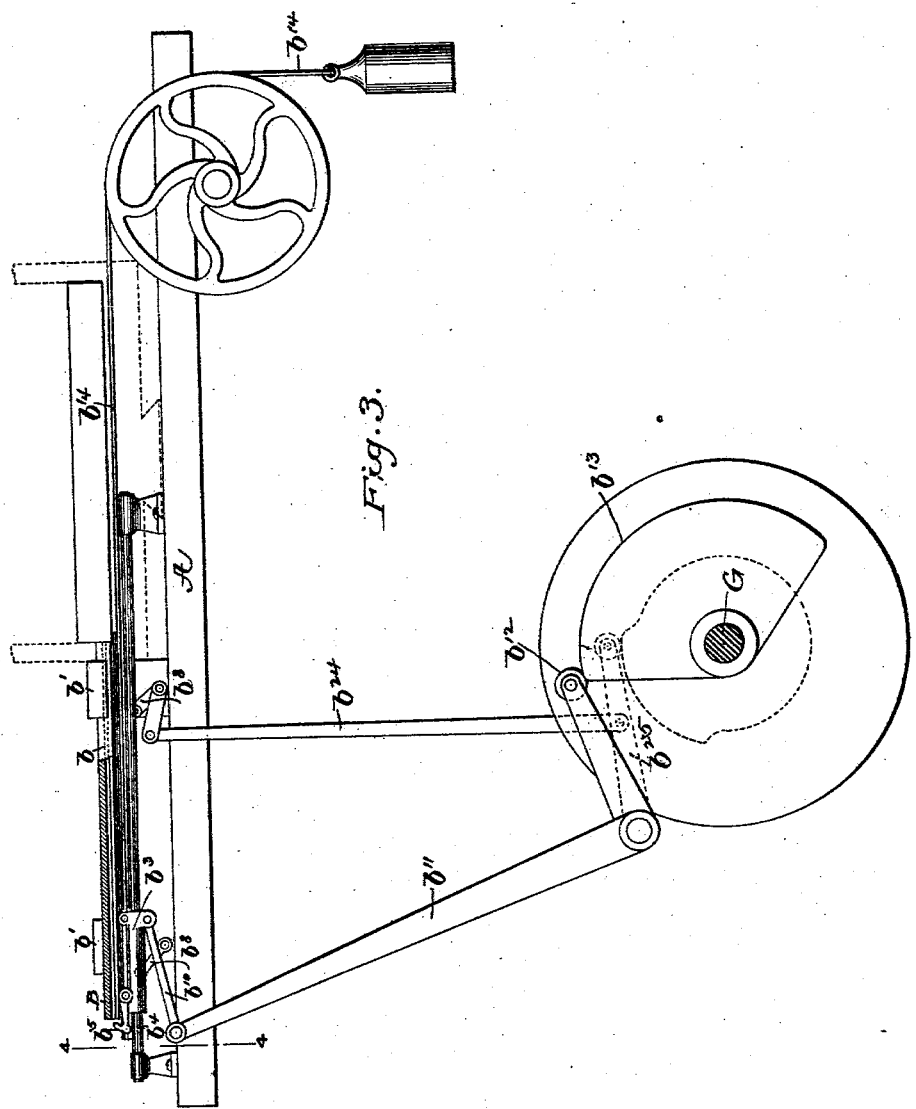
Figure 6:
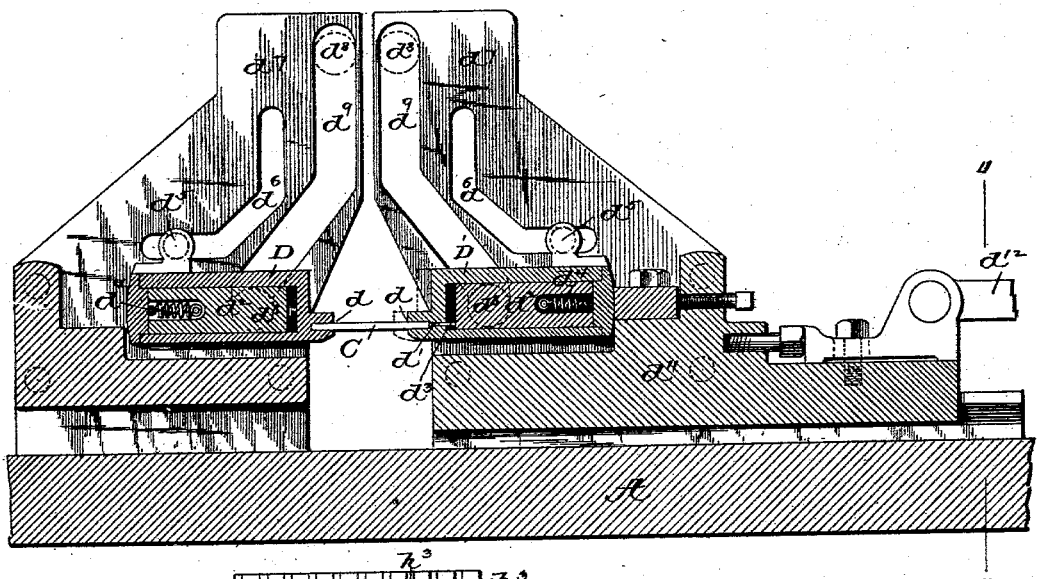
Figure 7:
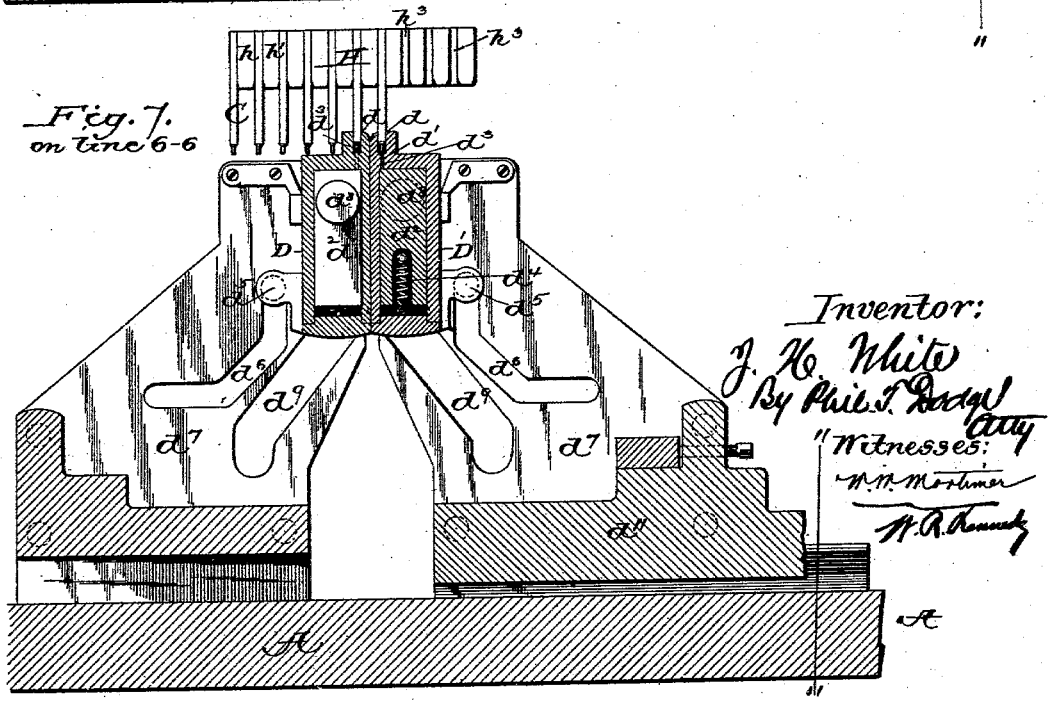
Figure 11:
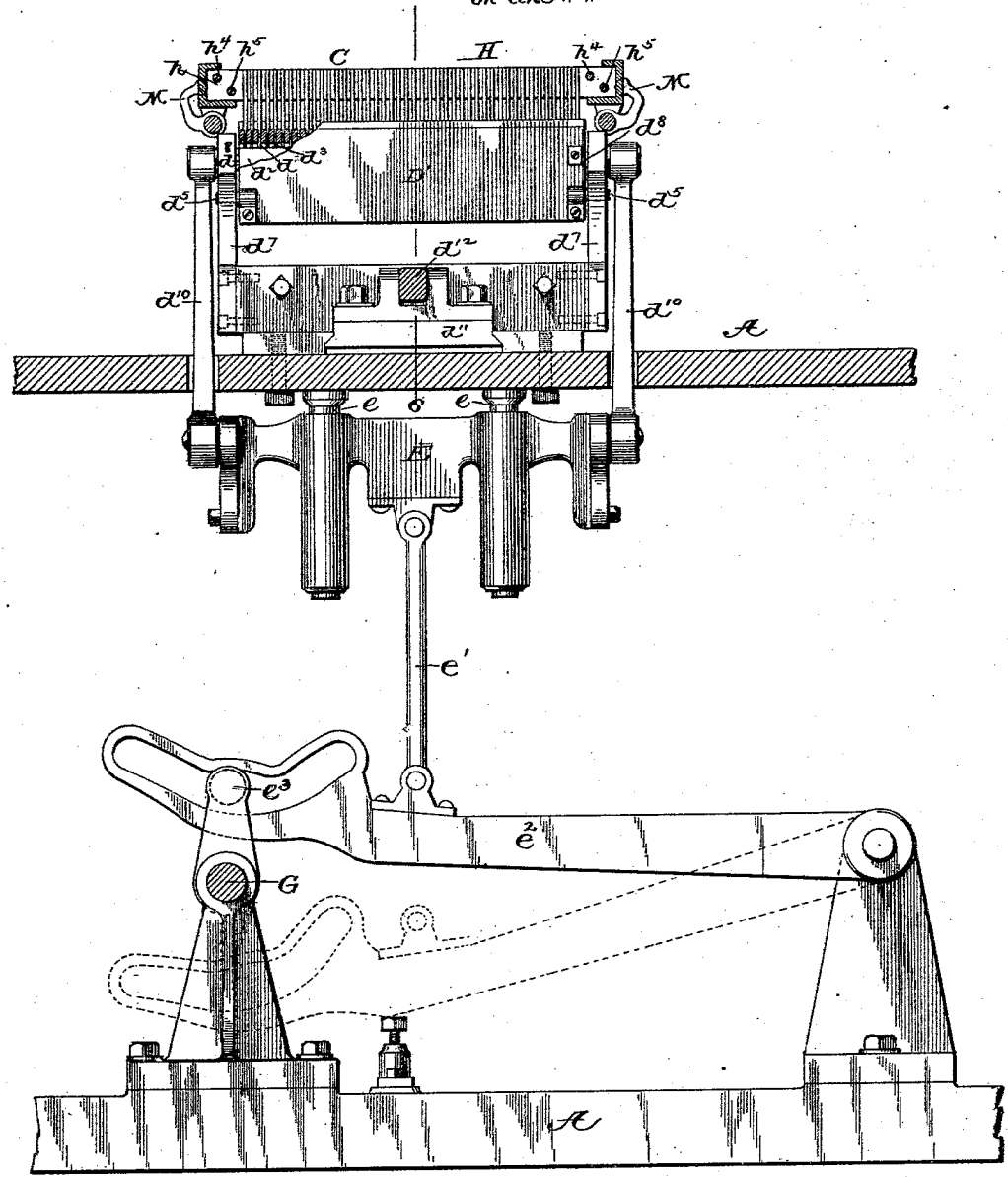

In the accompanying drawings, Figure 1 is a front elevation of a machine having my improvements incorporated therein, portions being shown in vertical section. Fig. 2 is a perspective view illustrating the manner in which the splints are delivered by the primary guides to the carriers. Fig. 3 is a side elevation on a large scale of the primary guides and attendant parts, showing the manner in which the splints are delivered to the carriers. Fig. 4 is a cross-section of the same on the line 4 4. Fig. 5 is a top plan view of the same. Fig. 5ª is a side elevation of the parts represented in Fig. 4, looking in the direction indicated by the arrow. Fig. 6 is a vertical cross-section through the upper part of the machine on the line 6 6, Fig. 11, showing the carriers in their normal or receiving positions. Fig. 7 is a similar view with their carriers in their elevated positions in the act of thrusting the splints into the receiving-frame. Fig. 8 is a perspective view illustrating the manner in which the carriers sustain the splints and deliver them to the frame. Fig. 9 is a top plan view of the receiving-frames and attendant parts of the machine, the frames being shown in section at one end. Fig. 10 is a vertical cross-section on the line 10 10 of Fig. 9. Fig. 11 is a vertical section of the principal parts of the machine on the line 11 11 of Figs. 1, 6, and 7. Figs. 12 and 13 are respectively a vertical cross-section and a horizontal cross-section through the carriers in their receiving positions. Figs. 14 and 15 are similar views showing the carriers advanced toward each other to seat the ends of the splints therein. Fig. 16 is a vertical cross-section showing the manner in which the carriers are turned upward to separate the splints and arrange them in vertical rows. Fig. 17 is a vertical section showing the manner in which the splints are held in their vertical positions preparatory to their entering the frames. Fig. 18 is a similar view showing the manner in which the splints are thrust into the frames. Fig. 19 is a similar view showing the manner in which the carriers retreat, leaving the splints in the frame.

Referring to the drawings, A represents the rigid main frame, which may be of any form adapted to sustain the operative parts.

B B' represent two horizontal parallel guides grooved in their inner or opposing faces and arranged at such distance apart as to give support to both ends of the splints C, which are introduced thereto in a horizontal position side by side in a row or column, as plainly shown in Fig. 2. The splints may be introduced to these guides from any suitable source and in any suitable manner. Being thus sustained at both ends, the splints are free to be advanced sidewise by mechanism which will be hereinafter described.

D D' represent two devices, which for convenience I term "carriers." They are seated in the frame immediately beyond the inner ends of the guides B, and they consist, as plainly shown in Figs. 6, 8, 12, &c., each of a block having in its front edge a horizontal groove $d$ and at the base of the groove a series of small holes $d'$, each intended to receive the end of a single splint. In a cavity in each of the carriers is mounted a sliding block $d^2$, having on its forward side a series of pins $d^3$, entering the holes $d'$, so that when the slide is pushed forward within the carrier the pins will be projected into the holes from the interior, so as to eject or expel the splints. A spring $d^4$, seated in the carrier, is attached at one end thereto and at the opposite end to the ejector-slide $d^2$, whereby the slide and its pins are held normally in a backward position. The two carriers are arranged in opposition to each other, and so that in their normal positions their inner grooved ends register with the respective guides B, that the line of splints may be forced sidewise from the guides into the carriers, as shown in Figs. 2, 12, and 13, each splint being in this the primary position of the parts sustained at both ends.

In order to secure the necessary action of the carriers, they must first be moved one toward the other and thereafter turned to upright positions and lifted bodily. In order to secure this action of the carriers, I provide them each at the rear end (see Figs. 1, 6, 7, and 8) with trunnions $d^5$, extending into angular slots $d^6$ in vertical plates $d^7$. I also provide the ejector-slide $d^2$ of each carrier with projected trunnions $d^8$, arranged to slide in angular grooves $d^9$ in the vertical plates. The trunnions $d^8$ enter the upper ends of arms $d^{10}$, pivoted at their lower ends to a vertically-reciprocating cross-head E, mounted on guides $e$ or otherwise guided. When the cross-head is down, the trunnions of the carriers stand in the lower outer ends of the slots, and the carriers themselves stand in horizontal position in opposition to each other with their inner grooved edges in position to receive and sustain the ends of the splints as the latter are delivered laterally from the guides B B'. When the cross-head rises, however, it acts through the arms $d^{10}$ and trunnions $d^8$ to lift the inner ends of the carriers, which are so controlled or guided in their movements by the trunnions and slots that they turn upward and outward and move inward until they assume vertical parallel positions, as seen in Figs. 7, 8, 18, &c.

The holes $d'$ in the front of each carrier are arranged opposite the spaces between the holes of the other carriers; or, in other words, the holes of the opposing carriers are alternated, as plainly shown in Figs. 13, &c. It follows, therefore, that if one carrier is moved toward the other while they are sustaining the ends of the splints lying side by side the solid portion of each carrier will drive the alternate splints backward endwise into the hole in the opposite carrier, as plainly shown in Fig. 15. Thus it will be seen that by the simple operation of approximating the carriers every second splint in the series is seated in the carrier D, while the intermediate splints are seated in the carrier D', as shown in Fig. 15. Now this approximation of the carriers after the splints are in position is effected by maintaining the carrier D and its vertical guide-plates $d^7$ on a slide $d^{11}$, seated in guides in the main frame, as plainly shown in Figs. 1 and 6, this slide being connected by a link $d^{12}$ to a lever $d^{13}$, which is pivoted to the main frame and acted upon at its lower end by a grooved cam-wheel $d^{14}$. This wheel is mounted on the main driving-shaft G, which carries at its end a crank $e^3$, acting, as shown in Figs. 1 and 11, in the slotted end of a lever $e^2$, which acts through a link $e'$ to operate the cross-head E, before mentioned, as the means of operating the carriers. The cam is so formed and the parts so timed that the carriers stand normally in their horizontal separated positions, as shown in Figs. 2 and 6, to receive the splints from the guides. After the splints are received the carrier D' is advanced toward its companion to seat the ends of the splints in the carriers alternately, as shown in Figs. 14 and 15. Carrier D' then retreats so that the splints seated in each carrier at their opposite ends are drawn out of the groove of the other carrier. The cross-head then rises, and in so doing rocks or tilts the carriers upward around the rear trunnions $d^5$ as centers, thereby causing the splints held by the one carrier to swing outward from between those in the other carrier, as shown in Fig. 16. The carriers continue their motion until they assume vertical positions, as shown in Figs. 8 and 18, with the splints standing vertically therein in two parallel rows, those of each row separated by an intervening space. After the splints are thus turned to a vertical position the carriers continue to move bodily upward in parallel lines in order to thrust the upper ends of the splints into slots in the overlying receiving-frame H, which is seated in the top of the machine, as shown in Figs. 18, 7, 8, and 11. As the splints reach their proper positions in the frame the trunnions $d^5$ reach the upper end of their guiding-slots, thus preventing further upward motion of the carriers, but as the arms $d^{10}$ continue to move upward they lift the ejector-slides $d^2$, (overcoming the resistance of springs $d^4$,) so that the pins $d^3$ act, as shown in Fig. 18, to drive the lower ends of the splints out of the carriers, which immediately retreat, as shown in Fig. 19, leaving the splints behind them in the frame. The carriers return to their original positions, are again filled with splints, and the preceding operations repeated, the slotted receiving-frame H being in the meantime advanced so as to bring empty grooves in position to receive splints when the carriers are again elevated.

The receiving-frames H may be constructed and operated in any suitable manner. In order, however, to insure the admission of the splints, prevent them from being splintered, and effect their firm retention by the frame, I recommend the construction of the frames, as shown in Figs. 8, 9, and 10, of a series of bars $h$ and $h'$, alternated side by side, as shown. The bars $h'$ are of uniform thickness from end to end, but the intermediate bars $h$ are shouldered down or reduced in thickness along their middle portions in order to leave splint-receiving slots $h^3$ between the bars when they are ranged in series. At each side of the frame I connect the bars together by two transverse rods $h^4$ and $h^5$ and springs $h^6$, passing through holes in the ends of the bars. The rod $h^5$ is pinned to the bar on one side of the frame, projected thence through nearly the entire series of bars, and then connected at its opposite end by the spring to the terminal bar on the opposite side. The rod $h^4$ is arranged in like manner, but projected from the opposite side of the frame. These rods and springs serve to keep the bars in line and to hold them together with a yielding or spring pressure, so that they may be crowded apart in order to increase the width of the slots $h^3$ when the splints are introduced. The object of using two rods $h^4$ and $h^5$ at each end of the frame is to give the latter increased rigidity and to prevent the flexibility of the frame which would otherwise result from the presence of the spring if a single rod were used. The top of the main frame is provided with horizontal guides to sustain the receiving-frames and admit of their being advanced horizontally step by step in order to bring their successive slots in position to receive the splints from the carrier rising beneath them.

In order that the receiving-frames may be introduced and operated in series one after another, I commonly provide means for coupling them temporarily together as they advance through the machine. These coupling devices may be of any suitable character. In the simple form shown in the drawings they consist of ears $h^6$, attached to one frame and arranged to engage over studs $h^7$ on the nuts, Fig. 8.

In order to advance the frames automatically step by step, that the successive slots may be brought in the receiving position, I provide, as shown in Fig. 9, two horizontally-reciprocating feed-dogs J to engage the ends of the bars $h$, which project endwise beyond their companions, thus forming, in effect, series of teeth on the ends of the receiving-frame. The feed-dogs J are connected by vertical pivots to reciprocating slides $j$, mounted in the main frame, and are urged inward by springs $j'$. The slides are operated in unison by links $j^2$, connecting them to crank-arms $j^3$ on a rock-shaft $j^4$, which is operated by its arm $j^5$, connected by link $j^6$ to the vertically-moving crosshead E, before mentioned, the parts being so timed that the dogs advance the receiving-frames while the carriers are in their lower positions.

As the splints are frequently cut from cross-grained wood and liable to be shattered if forcibly driven into the frames, I propose to provide the machine with means for momentarily separating the bars between which the splints are being inserted in order that they may readily enter the intervening slots or spaces. As shown in Figs. 1, 8, and 9, I employ for this purpose two arms M, mounted on rock-shafts $m$ in bearings on the main frame. The arms M, having tapered or wedge-shaped ends, are mounted in such position that when swung inward by the motion of their shafts they will enter between the ends of the frame-bars $h$, which are about to receive the splints, the effect of the arms being to separate the bars, that the splints may ascend easily between them and the intervening bar $h'$. Before the carriers which have introduced the splints descend the arms M are retracted, allowing the frame-bars to close together again under the influence of the springs, in order that they may firmly embrace the upper ends of the splints and hold them in their parallel positions separated from each other. The arms M receive motion, as shown in Fig. 1, through arms $m'$, attached to their rock-shafts $m$ and actuated in turn by the studs on a rising-and-falling plate $m^2$, carried by a vertically-guided rod $m^3$, actuated by link $m^4$ from a cam-wheel S on the main shaft G.

The essence of my invention in this regard resides in combining with the mechanism for sticking or inserting the splints a slatted frame to receive the splints and means for spreading or separating the slats or bars of the frame to facilitate the entrance of the splints, and it is to be understood that this combination may be embodied in a great variety of forms, involving, essentially, the mode of operation herein described and to be considered the mechanical equivalents of the devices shown.

Referring again to the mechanism herein shown for delivering the splints in the first instance to the carriers, which mechanism may be replaced by any other mechanism suitable for the purpose, attention is directed to Figs. 3, 4, 5, and 5ª, which disclose its details. The horizontal guides B B', which receive and sustain the ends of the splints, are formed on the under side of a plate $b$, which is mounted so as to slide longitudinally to a very limited extent in brackets $b'$, bolted to the main frame. The object of this longitudinal motion of the plate is to admit of its ends being slightly separated from the guides, which deliver the splints thereto, and from the carriers, to which in turn it delivers the splints, so that the series of splints which are for the moment under treatment may be cleanly separated from those before and after them. $b^3$ is a slide arranged to reciprocate on rods $b^4$, beneath the guides B B' and carrying at one end a pivoted hook-shaped dog $b^5$, whose office is to push before it the entire row or rank of splints lying in the guides B B' and force them out of said guides into the carriers D D'. In order that the dog may thus act, it must be raised to an operative position behind the column of splints, and thus held during its advance and thereafter lowered that it may return below the guides and beneath the incoming splints. This vertical adjustment of the dog is effected, as shown in Figs. 3, 4, 5, and 5$^a$, by providing it on one side with a projecting stud $b^6$, arranged to slide in a horizontal grooved bar $b^7$, sustained from the main frame by inclined pivoted links $b^8$, so that by swinging these links the slotted bar may be raised or lowered bodily without departing from the horizontal position. The dog-carrying slide is operated by a link $b^{10}$ on an angular lever $b^{11}$, carrying a roller $b^{12}$, which is acted upon by a cam-wheel $b^{13}$. A weighted cord $b^{14}$ tends to draw the slide forward, and thus advance the splints into the carriers. The cam and lever act at the proper time to move the slide backward. The bar $b^7$ to raise and lower the dog is controlled by a link $b^{24}$, extending from one of the links downward to the lever $b^{25}$. It will of course be understood that the parts operate to raise the bar $b^7$ and the dog and to hold them in this elevated position during the time that the slide and dog are being advanced, after which the bar and dog are lowered previous to the retreat of the latter.

The operation of the machine as a whole is as follows: The match-splints being carried laterally in close order into the guides B B' are engaged by the dog $b^5$ and advanced before it out of the guides B B' and into the carriers D D', which at this time stand in their horizontal and separated positions. The dog then retreats and the carrier D' advances toward its companion, causing the ends of the successive splints to be thrust into the two carriers alternately. The carrier D is now retracted, so that the splints seated in the holes of one carrier have their opposite ends drawn out of the slot in the opposite carrier, thus freeing the ends that they may be thrown upward. The carriers now turn upward to a vertical position, separating the splints into two vertical ranks, after which they continue their ascent until the splints are introduced onto the receiving-frame above. Just before the splints are inserted into the frame the arms M swing over and separate the bars of the frame that the splints may enter readily between them. After the carriers have inserted the splints the arms M retreat, allowing the frame-bars to close together firmly upon the upper ends of the splints, after which the carriers descend to their original positions, their initial downward movement being accompanied by the elevation of the ejector blocks and pins to force the ends of the splints out of the holes into the carriers, so that there may be no tendency of the carriers to draw them out of the receiving-frame.

While I have described herein those details which I prefer to employ in practice, it is to be understood that the driving or actuating devices may be of any suitable form adapted to give the requisite motions to the principal operative parts. I believe myself to be the first to employ two carriers adapted to receive, separate, and drive the splints, as hereinbefore described, and it is to be understood that these carriers may be modified in form and in their details of construction, and that the means for guiding them during their movements to and from each other and from the horizontal to the upright positions may be modified at will within the range of mechanical skill, provided they retain a mode of action essentially such as herein described. The trunnions and slots constitute simple and efficient guides for the purpose; but the skilled mechanic will understand that there are many other equivalent guiding devices known in the art which may be employed.

It will be observed that the ends of the splints which were seated in the perforations in the carrier are thereby reduced in size and given a cylindrical form, or, in other words, have tenons formed on their ends. This is advantageous in that reduces the amount of material consumed by dipping them and reduces the size of the heads, so that the matches present a neater appearance and may be more closely and safely packed.

Having thus described my invention, what I claim is—

1. In a splint-sticking mechanism, two alternate perforated carriers arranged in opposition to each other and in position to receive the opposite ends of intervening splints, in combination with means for first approximating said carriers and thereafter separating and turning them, whereby splints aligned in close order are seated in the carriers alternately and then separated and arranged in open order in two ranks.

2. In a splint-sticking mechanism, the two opposing carriers provided with grooves and alternated openings to receive the ends of the splints, in combination with means for first approximating said carriers and thereafter separating them, giving them a quarter-revolution, and finally moving them in parallel lines at right angles to the line of separation, whereby they are adapted to receive the splints in close order, to seat them alternately in the respective heads, arrange them in open order in two ranks, and insert them into a frame or other receiver.

3. In a splint-sticking mechanism, the combination of the grooved guides to sustain the splints at opposite ends and in close order, and carriers mounted to reciprocate and rotate, provided in their opposing faces with grooves to receive the ends of the splints from the guides and with alternate openings for the individual splints, a slatted sticking-frame, and means for reciprocating and rotating said carriers, substantially as described.

4. As a means of separating and arranging in line in open order a line of splints presented thereto in close order, two opposing relatively-movable carriers provided in their opposing faces with grooves to receive the ends of the splints and at the base of the grooves with alternated openings to receive the individual splints, whereby the approximation of the carriers is caused to seat the splints in their openings alternately, so that when the carriers are separated the alternate splints will be retained and carried in open order by the respective carriers.

5. In a splint-sticking mechanism, the two grooved and perforated carriers, the cheek-plates provided with angular slots to guide said carriers, the reciprocating cross-head and its connection for moving the carriers in their guides, mechanism for moving the guides of one carrier to and from those of the other carrier, a slatted frame to receive the splints, and mechanism for advancing the frame step by step in position to receive the splints from the carriers.

6. In a splint-sticking mechanism, grooved guides B B' to sustain the ends of the splints, a feed dog or carrier to advance the splints laterally through and beyond the guides, the grooved and perforated carriers to receive the splints from the guides, mechanism for reciprocating and rotating the carriers, a frame to receive the splints from the carriers, and means for advancing the frame step by step, whereby the splints arranged in line in close order are automatically inserted in open order into the receiving-frame.

7. In combination with the grooved and perforated splint-carrier D, a reciprocating block $d^2$, provided with ejector-pins, and mechanism, substantially as shown, for giving the carrier a quarter-revolution and advancing and retracting the ejector-pins as the carrier is moved from one extreme to the other.

8. In combination with the grooved and perforated carrier D to receive the splints, having trunnions $d^5$, the sliding ejector-block provided with trunnions $d^8$, the intervening spring, the cheek-plates having angular slots to receive the trunnions, and the reciprocating arms $d^{10}$, connected to the trunnions of the ejector-blocks, whereby the carriers are turned from a horizontal to a vertical position and the ejectors finally operated to deliver the splints in an upward direction.

9. In a splint-sticking mechanism, a slatted receiving-frame having its slats or bars urged together by springs, in combination with an inserting or sticking device to introduce the splints endwise between the slats, and mechanism for automatically and momentarily separating the slats during the insertion of the splints, whereby the shattering of weak or cross-grained splints is prevented.

10. The slatted frame having its slats pressed together by springs, in combination with the reciprocating carrier to present the splints endwise between the slats, means for momentarily separating the slats to admit the splints, an ejector to force the splints endwise from the carrier, and operating devices, substantially as shown, timed to effect the separation of the slats, the insertion of the splints between them, the closing of the slats, and the withdrawal of the carrier in the order named.

11. In a splint-sticking mechanism, the receiving-frame consisting of the slats and their connecting-rods and springs, in combination with the movable dogs or arms M, arranged to act between the slats at opposite ends.

12. In a splint-sticking machine, the receiving-frame consisting of the series of parallel slats, two rods passing through said slats at each end, and springs connected to the ends of the rods, substantially as shown.

13. In a splint-sticking machine, a receiving-frame consisting of the slats or bars arranged to leave spaces or openings between their outer ends, in combination with connecting-rods and springs, whereby the frames are adapted for the co-operation of the separating devices and the feed-dogs with the ends of the slats.

14. In a splint-sticking machine, the combination of the grooved guides to sustain the ends of the splints, the reciprocating carrier, and the feed-dog $b^5$, pivoted thereto, the grooved dog-controlling bar $b^7$, and mechanism for reciprocating the carrier and for raising and lowering the controlling-bar, as described, whereby the dog is advanced in an elevated position and retracted in a depressed position.

15. In a splint-sticking mechanism, the combination of a carrier to present the splints to a frame or holder, said carrier provided with holes to receive the individual splints, and means for forcing the heads of the splints into said holes, whereby the head is reduced in size to receive the composition.

In testimony whereof I hereunto set my hand, this 31st day of March, 1891, in the presence of two attesting witnesses.

JNO. H. WHITE.

Witnesses:
W. R. KENNEDY,
FABIUS STANLY ELMORE.